Sept. 16, 1930.  F. W. HIGHFIELD  1,775,958
WEIGHING AND TESTING APPARATUS OF THE STEELYARD TYPE
Filed July 16, 1928
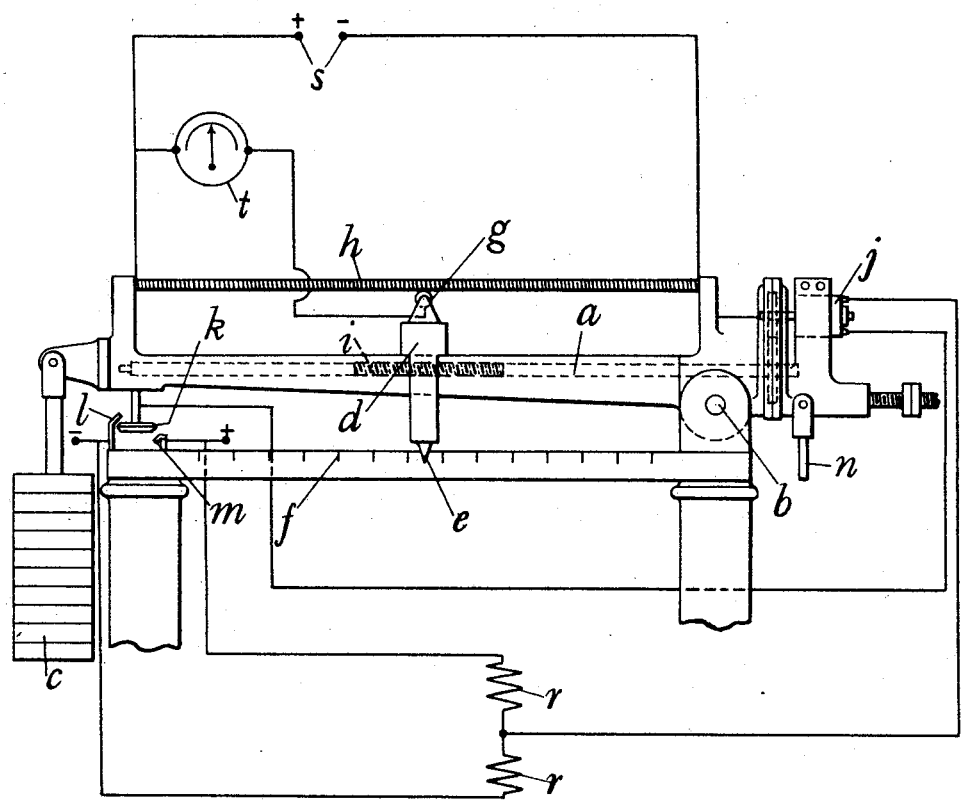
F. W. Highfield
INVENTOR
By: Marks & Clerk
Attys.

Patented Sept. 16, 1930

1,775,958

UNITED STATES PATENT OFFICE

FRANK WOOTTON HIGHFIELD, OF COVENTRY, ENGLAND

WEIGHING AND TESTING APPARATUS OF THE STEELYARD TYPE

Application filed July 16, 1928, Serial No. 292,977, and in Great Britain July 22, 1927.

This invention relates to weighing and testing apparatus of the steelyard type in which a load is counterbalanced by a weight which is capable of being moved along a beam or lever. The invention is applicable to various forms of weighing machines, machines for testing materials, such as tensile testing machines, and dynamo-meters employed for the testing of prime movers.

The object of the invention is to provide automatic electrical means for indicating the condition of balance.

The invention comprises the combination with the beam or the like and the sliding weight, of an electric circuit containing any suitable indicating instrument the reading of which is controlled by and corresponds with the position of the weight.

The accompanying drawing illustrates diagrammatically one manner of applying the invention to a steelyard type machine.

Referring to the diagram, the beam is indicated by $a$. This is pivoted at $b$ and is loaded at the other end by weights $c$. The beam is provided with the usual sliding weight $d$ which may be provided with a pointer $e$ travelling over a fixed graduated scale $f$. In combination with the weight is arranged a moving contact piece $g$ insulated from the beam which can travel along a resistance $h$. The latter may be of any convenient type, for example, a helical wire resistance wound on a suitable rigid core. The weight is caused to move along the beam by means of a screw $i$ which can be rotated through any convenient mechanism by means of a small electric motor $j$ carried on one end of the beam. The electric motor is controlled by a movable contact $k$ carried at the free end of the beam. This contact co-operates with a pair of fixed contacts $l$, $m$ maintained at a suitable difference of electric potential situated at the upper and lower limits of the movement of the beam. The arrangement of the motor circuit and of the contacts $k$, $l$, $m$ is such that when the contact $k$ touches the contact $l$, the motor drives the screw in one direction, whilst when the contact $l$ touches the contact $m$, the screw is driven by the motor in the reverse direction. When the state of balance is obtained, the contact $k$ occupies a neutral or intermediate position. The load is applied to the beam through the link $n$. Any suitable electrical connections may be employed in the circuit of the motor $j$. For example, as shown, one end of the circuit containing the motor is attached to $k$, and the other end to the junction of a pair of resistances $r$. The opposite ends of the latter are respectively connected to the contacts $k$, $l$, and a current supply terminal.

The resistance $h$ may form part of a Wheatstone bridge system containing a galvanometer. Alternatively the resistance $h$ may form part of a potentiometer or other suitable system containing an ohmmeter or other convenient indicator. In either case, the indicating instrument is graduated to indicate the position of the weight on the beam at any instant. The direction of movement of the instrument also indicates the direction in which the weight is moving. In the example illustrated a potentiometer is used. The ends of $h$ are connected to any convenient source of current at the terminals $s$, whilst the contact $g$ is connected through the indicating instrument $t$ to one end of the potentiometer.

The invention is particularly useful in conjunction with dynamometers for testing prime movers, but it is applicable also to ordinary weighing machines, or machines for testing materials, or for other analogous purposes in which apparatus of the steelyard type is employed.

The invention is not limited to any particular mechanical or electrical details, as these may be varied to meet different requirements.

Having thus described my invention what I claim as new and desire to secure by Letters Patent is:—

In weighing and testing apparatus of the steelyard type, the combination comprising a pivoted beam, a sliding weight, an electric circuit consisting in part of a resistance arranged in part on the beam, a contact on the weight co-operating with said resistance on the beam, an electrical indicating instrument controlled by the position of the weight, the said instrument being in electrical connection with the contact on the weight, a screw for sliding the weight, a motor for rotating the screw, an electric circuit in combination with the motor, and contacts on the beam and adjacent fixed part of the machine for controlling and reversing the current supply to the motor, substantially as described.

In testimony whereof I have signed my name to this specification.

FRANK WOOTTON HIGHFIELD.